US009883194B2

(12) United States Patent
Wu et al.

(10) Patent No.: US 9,883,194 B2
(45) Date of Patent: Jan. 30, 2018

(54) MULTIPLE BIT RATE VIDEO DECODING

(71) Applicant: Microsoft Technology Licensing, LLC, Redmond, WA (US)

(72) Inventors: Yongjun Wu, Bellevue, WA (US); Haoyun Wu, Redmond, WA (US); Shyam Sadhwani, Bellevue, WA (US); Sudhakar Prabhu, Redmond, WA (US); Glenn Evans, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 232 days.

(21) Appl. No.: 14/739,442

(22) Filed: Jun. 15, 2015

(65) Prior Publication Data
US 2016/0366430 A1    Dec. 15, 2016

(51) Int. Cl.
| H04N 19/44 | (2014.01) |
| H04N 19/463 | (2014.01) |
| H04N 21/2343 | (2011.01) |
| H04N 21/2662 | (2011.01) |
| H04N 19/423 | (2014.01) |
| H04N 19/433 | (2014.01) |
| H04N 19/46 | (2014.01) |

(52) U.S. Cl.
CPC .......... *H04N 19/44* (2014.11); *H04N 19/423* (2014.11); *H04N 19/433* (2014.11); *H04N 19/46* (2014.11); *H04N 21/23439* (2013.01); *H04N 21/2662* (2013.01)

(58) Field of Classification Search
CPC .. H04N 19/44; H04N 21/23439; H04N 19/46; H04N 19/423; H04N 19/433; H04N 21/2662
See application file for complete search history.

(56) References Cited

U.S. PATENT DOCUMENTS

| 7,825,936 B1 | 11/2010 | Bastos et al. |
| 8,233,527 B2 | 7/2012 | Schmit et al. |
| 8,265,144 B2 | 9/2012 | Christoffersen et al. |
| 8,311,102 B2 | 11/2012 | Lu |

(Continued)

FOREIGN PATENT DOCUMENTS

EP    2869562 A1    2/2016

OTHER PUBLICATIONS

"Second Written Opinion Issued in PCT Application No. PCT/US2016/036543", dated Dec. 21, 2016, 8 Pages.

(Continued)

*Primary Examiner* — Neil Mikeska
(74) *Attorney, Agent, or Firm* — Patent GC LLC

(57) ABSTRACT

In a video processing system including a video decoder, to handle frequent changes in the bit rate of an encoded bitstream, a video decoder can be configured to process a change in bit rates without reinitializing. The video decoder can be configured to reduce memory utilization. The video decoder can be configured both to process a change in bit rate without reinitializing while reducing memory utilization. In one implementation, the video processing system can include an interface between an application running on a host processor and the video decoder which allows the video decoder to communicate with the host application about the configuration of the video decoder.

24 Claims, 6 Drawing Sheets

(56) References Cited

U.S. PATENT DOCUMENTS

| | | | |
|---|---|---|---|
| 8,462,841 B2 | 6/2013 | Schlanger | |
| 8,768,078 B2 | 7/2014 | Neubrand | |
| 2005/0172028 A1* | 8/2005 | Nilsson | H04L 29/06 709/231 |
| 2008/0267590 A1* | 10/2008 | Otsuka | H04N 19/127 386/354 |
| 2009/0041385 A1* | 2/2009 | Watanabe | H04N 19/172 382/298 |
| 2009/0086824 A1 | 4/2009 | Lin | |
| 2010/0290760 A1* | 11/2010 | Dachiku | H04N 5/76 386/345 |
| 2011/0032995 A1* | 2/2011 | Chua | G06F 13/28 375/240.24 |
| 2012/0110284 A1* | 5/2012 | Matsumoto | H04H 40/90 711/154 |
| 2012/0275516 A1* | 11/2012 | Tanaka | H04N 19/50 375/240.12 |
| 2012/0314775 A1* | 12/2012 | Laksono | H04N 19/12 375/240.25 |
| 2013/0051478 A1* | 2/2013 | Wu | H04N 19/159 375/240.25 |
| 2016/0381371 A1 | 12/2016 | Ogawa | |

OTHER PUBLICATIONS

"Supporting Direct3D 11 Video Decoding in Media Foundation", Published on: Nov. 22, 2011 Available at: https://msdn.microsoft.com/en-us/library/windows/desktop/hh162912(v=vs.85).aspx.

Liu, Peter, "Introducing the Unified Video Decoder (UVD)", Published on: Feb. 19, 2014 Available at: http://developer.amd.com/community/blog/2014/02/19/introducing-unified-video-decoder-uvd/.

Zhao, et al., "Parallel implementation of Multi-view Video Decoder for Reduction in Power Consumption", In International Journal of Computer Applications, vol. 58, No. 17, pp. 23-26.

Girotra, Abhishek, "HardwareAccelerated Video Decode on the Intel® Atom™ Processor with the Intel® System Controller Hub US15W Chipset Platform", In White Paper, Aug. 2009, 20 pages.

Kowaliski, Cyril, "New Intel IGP drivers add H.265, VP9 Hardware Decode Support", Published on: Jan. 15, 2015 Available at: http://techreport.com/news/27677/new-intel-igp-drivers-add-h-265-vp9-hardware-decode-support.

Hsu, Wei-Lien., "Video Transcoding Using GPU Accelerated Decoder", In Proceedings of SPIE 7872, Parallel Processing for Imaging Applications, Jan. 25, 2011, 2 pages.

Ku, Andrew, "Video Transcoding Examined: AMD, Intel, and Nvidia In-Depth", Published on: Feb. 6, 2011 Available at: http://www.tomshardware.com/reviews/video-transcoding-amd-app-nvidia-cuda-intel-quicksync,2839-6.html.

Sullivan, Gary J., "DirectX Video Acceleration Specification for1-1.264/AVC Decoding", Published on: Dec. 2007 Available at: http://www.microsoft.com/en-us/download/details.aspx?id=11323.

Artigas, Xavi, "Playback tutorial 8: Hardware-Accelerated Video Decoding", Published on: Jul. 24, 2012 Available at: http://docs.gstreamer.com/display/GstSDK/Playback+tutorial+8%3A+Hardware-accelerated+video+decoding.

Syed, et al., "Virtualized Software Transcoding for Cloud TV Services", Retrieved on: Feb. 23, 2015 Available at: http://www.nctatechnicalpapers.com/Paper/2014/2014-virtualized-software-transcoding-for-cloud-tv-services/download.

"Supporting DXVA 2.0 in DirectShow", Published on: Mar. 24, 2012 Available at: https://msdn.microsoft.com/en-us/library/windows/desktop/aa965245(v=vs.85).aspx.

"International Search Report and Written Opinion Issued in PCT Application No. PCT/US2016/036543", dated Sep. 22, 2016, 12 Pages.

Zambelli, Alex, "IIS Smooth Streamimg Technical Overview Author: Smooth Streaming Technical Overview", Retrieved From <<http://www.bogotobogo.com/VideoStreaming/images/AdaptiveLiveStreaming/IIS_Smooth_Streaming_Technical_Overview.pdf>>, Mar. 1, 2009,17 Pages.

"Non-Final Office Action Issued in U.S. Appl. No. 14/739,298", dated Apr. 6, 2017, 12 Pages.

"Notice of Allowance Issued in U.S. Appl. No. 14/739,298", dated Aug. 1, 2017, 7 Pages.

"International Preliminary Report on Patentability Issued in PCT Application No. PCT/US2016/036543", Dated: Sep. 8, 2017, 9 Pages.

* cited by examiner

MULTIPLE BIT RATE VIDEO DECODING

BACKGROUND

Digital media data, such as still images and audio and video (which is a sequence of images), are commonly encoded into bitstreams that are transmitted or stored in data files. An encoded bitstream typically conforms to an established standard, such as SMPTE VC-1, H.264/AVC and HEVC/H.265. Many such standards, particularly those used for distribution of video data, such as in connection with video streaming services over computer networks, include a form of data compression called motion compensation. Motion compensation is one type of compression technique that reduces interframe redundancies in a sequence of images. Generally speaking, interframe redundancies in a sequence of images are reduced by defining groups of images in the sequence, which each group having one or more reference images to which the remaining images in the group are compared. Comparison results are computed and encoded to reduce the amount of information stored to encode the group of images.

In many implementations of streaming video data, the encoded bitstream can be delivered at multiple bit rates. For example, the same content can be encoded at different bitrates and stored on a storage device. A bit rate at which the bitstream is encoded can be selected dynamically at the time of transmission of the encoded bitstream over a network. This selection can be based on measured or estimated available bandwidth or transmission performance of the network and/or characteristics of a display device. A change in bit rate of the encoded bitstream also can result from a change in encoding factors, such as format, including but not limited to spatial or temporal resolution or display format (e.g., interlaced or progressive) of the input video data to be encoded or of the output video data when decoded, or such as encoding parameters, including but not limited to a profile, level, quantization parameters or number of references. When decoding, such encoding factors result in corresponding decoding factors.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

When decoding an encoded bitstream of video data which has been encoded using a compression technique that reduces interframe redundancies, there can be significant latency in producing the first few output images for a group of images. When decoding an encoded bitstream that includes video data which has been encoded at multiple bit rates, where the multiple bit rates are achieved by changing encoding factors, additional latency can be introduced into the decoding process each time the decoding factors change. This additional latency can arise due to reinitialization of a video decoder to adapt the video decoder to decode a next group of images in the encoded bitstream with different decoding factors. Generally, the video decoder completes decoding a group of images from a part of the bitstream which were encoded with a first set of encoding factors, changes decoding factors, and then begins decoding the next group of images from a next part of the bitstream which were encoded with a second set of encoding factors different from the first set of encoding factors. Additional memory resources also may be consumed because the encoded bitstream for the second group of images is stored in memory while the video decoder completes decoding the first group of images.

In a video processing system including a video decoder, to handle frequent changes in the encoding factors used in an encoded bitstream, the video decoder can be configured to change decoding factors without reinitializing. In another implementation, the video decoder can be configured to reduce memory utilization. In another implementation, the video decoder can be configured both to change decoding factors without reinitializing and to reduce memory utilization. In one implementation, the video processing system can include an interface between an application running on a host processor and the video decoder which allows the video decoder to communicate with the host application about the configuration of the video decoder.

In the following description, reference is made to the accompanying drawings which form a part hereof, and in which are shown, by way of illustration, specific example implementations of these techniques. It is understood that other embodiments may be utilized and structural changes may be made without departing from the scope of the disclosure.

DETAILED DESCRIPTION

The following section describes example implementations for decoding video data which was encoded at multiple bit rates using multiple different sets of encoding factors.

Figure 1:
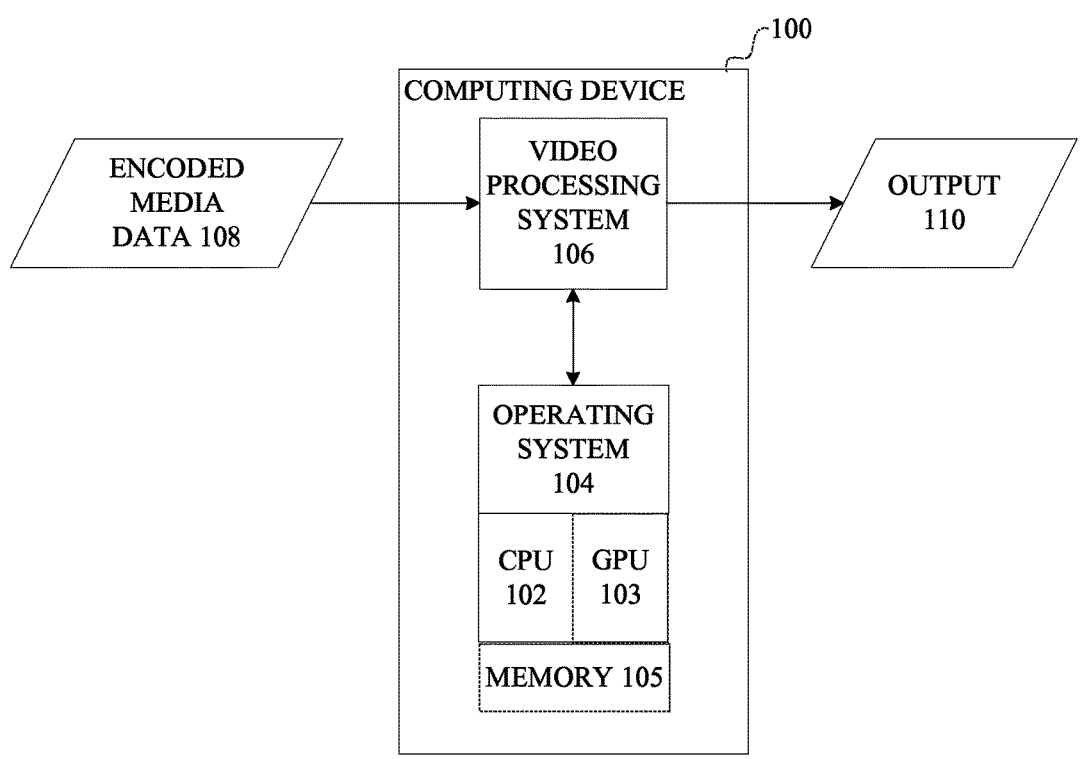
FIG. 1 is a block diagram of a video processing system.

Referring to FIG. 1, a computing device 100 includes a video processing system 106 which includes a video decoder. In one implementation, the video processing system 106 can be implemented by using a computer program executed on the computing device 100, where the computer program configures the computing device 100 to perform the functions of, and configure memory and other resources used by, the video processing system 106. The computing device 100 generally comprises at least one central processing unit 102, optionally one or more graphics processing units 103 or other processing logic, memory 105, and an operating system 104. An example computing device is described in more detail below in connection with FIG. 6.

In this example, the video processing system 106 can be implemented using an application that runs on the computing device 100, while the operating system manages access by that application to the resources of the computing device, such as the central processing unit 102, graphics processing unit 103 and other components of the computing device, such as the memory 105, storage, input and output devices, and communication interfaces. The application can utilize the resources of either or both of the central processing unit and graphics processing unit or other logic devices to implement a video decoder.

The video processing system 106 receives encoded video data 108 and decodes the video data with a video decoder to provide output video data 110 as a sequence of images. Video data has a temporal resolution, indicating a number of images per unit of time, such as a number of frames or fields per second. The video data also has a spatial resolution, indicating a number of pixels in each of at least two dimensions. Each image also has a format specifying a number of lines of pixels. Each pixel represents visual information and can be in any of a variety of formats. Two common formats for images include interlaced and progressively scanned images. The output video data 110 generally is in a format that conforms to a known standard and can be associated with data providing an indication of the format, so that the video data can be properly displayed on a display device. Similarly, the encoded video data 108 generally is in the form of an encoded bitstream which also can include other types of data. The encoded bitstream is in a format, typically defined by a standard, which the video processing system 106 is implemented to decode.

Generally speaking, to decode video data, the video decoder reads the encoded video data and applies various operations to the encoded video data using decoding factors in accordance with the encoding standard. The decoding factors correspond to the encoding factors used to encode the video data. For each image of video data to be decoded, there may be one or more intermediate images or other data produced by different stages of the decoding process. Such data is stored in memory accessed by the video decoder. Certain contents of this memory can be discarded as each decoded image is output, with the memory then being re-used for data for the next image to be decoded.

For the purposes of illustration in this description, only decoding of a single stream of video data is described. It should be understood that other data can be received along with encoded video data in an encoded bitstream. An encoded bitstream thus generally can represent a combination of encoded digital media data, such as audio, video, still images, text and auxiliary information. If multiple streams of a variety of types of data are received as a single multiplexed bitstream, such as audio and video, the encoded bitstreams for the different types of data can be demultiplexed into separate bitstreams for decoding. Encoded bitstreams generally either are transmitted, in which case the may be referred to as streamed data, or are stored in data files, or can be stored in data structures in memory. Encoded bitstreams, and files or data structures they are stored in, generally conform to established standards, examples of which include but are not limited to, SMPTE VC-1, H.264/AVC and HEVC/H.265.

The video decoder used by the video processing system 106 can include a combination of one or more devices of, and/or one or more applications running on, the computing device. The video decoder reads and decodes encoded video data from an encoded bitstream to produce output video data 110. Example implementations of a video decoder are described in more detail below. The video decoder can be used by another application (not shown) to provide video playback for that application. In such a case, the video decoder generally provides the output video data in memory, and the application accesses that memory as an input to the application.

Figure 2:
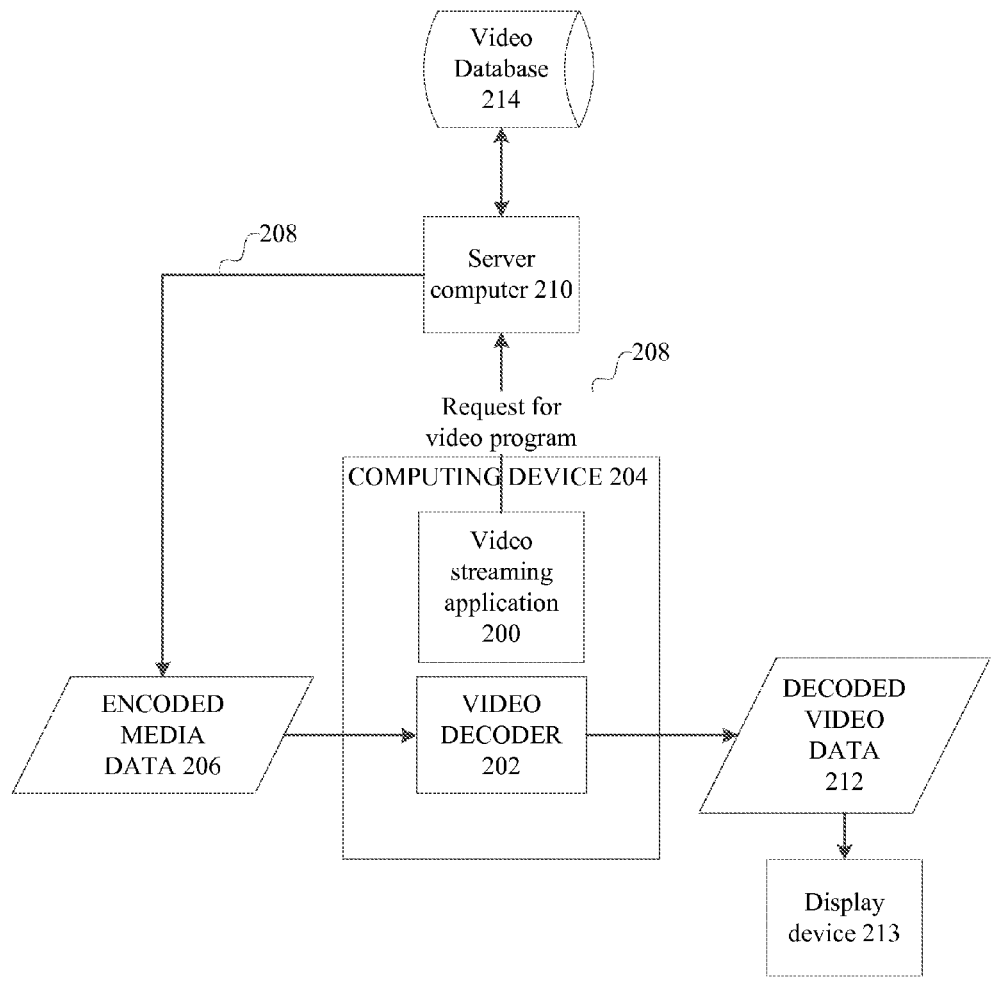
FIG. 2 is a block diagram of an example operating environment for playback of media.

As a particular example of an operating environment, shown in FIG. 2 a video streaming application 200, such as for a video on demand service or internet-based video service, may access a video decoder 202 on a computing device 204. The video streaming application 200 may request a video program from a video database 214 through a server computer 210 over a computer network 208, such as the internet. The server may provide, to the computing device, the requested video program as an encoded bitstream of data 206 over the computer network 208.

In an operating environment such as shown in FIG. 2, the bit rate of the encoded video data 206 can be changing frequently. For example, the bit rate can be changing as frequently as every 2 seconds, 30 seconds, or 1 minute up to 2 minutes for a variety of reasons. For example, the server computer 208 may change from providing 1080p video to 720p high definition video or vice versa, or between high definition and standard definition formats due to a change in available bandwidth for transmission. In this implementation, the streamed video data includes an encoded bitstream with video data encoded using different encoding factors. In the particular example of changing from 1080p video to 720p video, the format of a first section of the video data and the format of a second section of the video data are different in the encoded bitstream as streamed from the server computer to the computing device. It should be understood that the foregoing is merely an illustrative example and is not meant to be limiting. The server computer may change the encoding factors used to encode any part of the streamed encoded bitstream to be any encoding factors which are supported by the server computer.

Information specifying the encoding factors used in generating an encoding bitstream, and/or their corresponding decoding factors, can be provided as part of the encoded bitstream or as additional data related to the encoded bitstream. The video streaming application 200 directs the video decoder to decode the received data 206 and output the decoded video data 212 to a display device 213.

Having now described an example operating environment, a few example implementations of a video decoder will now be provided.

In some implementations, the video decoder can be implemented using a computer program that is executed using the processing unit (CPU) 102 of the computing device. In such an implementation, the part of the computer program that implements decoding is executed by the CPU and uses image data and encoding factors input from and output to memory accessible by the application through the CPU. The intermediate images generated by the executed computer program during decoding are stored as image data in the memory accessible to the application through the CPU.

In some implementations, the video decoder can be implemented using a computer program that is utilizes resources of the graphics processing unit (GPU) 103 of the computing device. In such an implementation, the computer program implementing the video processing system executes on the processing unit (CPU) 102 and manages providing instructions to the GPU. In some implementations, the part of the video decoder implemented on the GPU can be implemented using a computer program that is called a "shader". In some implementations, the portion of the video decoder implemented on the GPU can include custom firmware of the GPU. In yet other implementations, the portion of the video decoder implemented on the GPU can include functional logic of the GPU dedicated to video decoding operations. The image data input to and output from the GPU-implemented video decoder is defined as a "texture". The intermediate images generated by the GPU-implemented video decoder during the decoding process are stored as textures in memory accessible to the GPU-implemented video decoder.

In a GPU-implemented video decoder, the video decoder can be implemented to take advantage of parallelization and/or fast matrix, vector and other processing available through the graphics coprocessor. For example, a graphics processor can process blocks of image data in parallel for improved performance. In general, blocks of image data, and parameters applied to the blocks of image data, are transferred from the central processing unit to the graphics processing unit, and stored in memory accessible by the graphics processing unit.

An application can utilize and application programming interface (API) to a graphics library, where a video decoder is implemented as a shader within the graphics library, or as other computer program code to configure an access a GPU-implemented video decoder. The API manages access, through the central processor, to the graphics coprocessor and memory resources of the computing device. Examples of commercially available API layers are the OpenGL interface from Khronos Group and the Direct3D interface from Microsoft Corporation. An application can also utilize the graphics coprocessor without using such an API. Similarly, if the implementation uses computer programs executed on the CPU, such programs can process blocks of image data in parallel for improved performance by executing in multiple threads on multiple cores.

In some implementations, the video decoder can be implemented in part using dedicated video decoding hardware that receives encoded video data, and decoding factors, at an input, and outputs decoded video data at an output. The inputs and outputs of such decoding hardware generally are implemented in the form of one or more buffer memories. Such decoding hardware generally includes processing logic and memory. The processing logic can be implemented using a number of types of logic device or combination of logic devices, including but not limited to, programmable digital signal processing circuits, programmable gate arrays, including but not limited to field-programmable gate arrays (FPGA's), application-specific integrated circuits (ASICs), application-specific standard products (ASSPs), systems-on-a-chip systems (SOCs), complex programmable logic devices (CPLDs), or a dedicated, programmed microprocessor. The processing logic accesses memory which comprises one or more memory devices which store data used by the processing logic when decoding the encoded video data, decoding factors used by the decoding process, intermediate data computed for the decoding process, and the decoded video data. Such decoding hardware may be present as a coprocessor of a computing device. In such an implementation, a computer program executed on the processing unit (CPU) can manage utilization of the decoding hardware to decode a received encoded bitstream.

In such an implementation, the video processing system provides an encoded bitstream to the video decoder for decoding. If the bit rate changes due to a change in encoding factors, the video decoder adapts to the change. This adaptation can be implemented using either or both of the techniques described herein. The first technique avoids reinitialization of the video decoder given a change in decoding factors. The second technique reduces memory utilization by the video decoder using an array of textures.

Given an implementation of a video decoder, the video decoder can include an interface through which other computer programs can use the video decoder. As part of this interface, the video decoder can provide information about capabilities and specifications of the video decoder. In pertinent part, this interface can include data describing whether the video decoder is capable of changing encoding factors without reinitializing. This interface can include data describing whether the video decoder is capable of using an array of textures, described in more detail below, to reduce memory utilization by the video decoder.

Using the first technique, the video decoder is configured to be capable of processing first video data from a first encoded bitstream and switching to processing a second video data from a second encoded bitstream having different encoding factors than the first video data. For example, a video decoder can be configured to process HEVC encoded video data at either 720p or 1080p resolutions.

To allow for the video decoder to continue decoding an encoded bitstream in response to a change encoding factors, the video decoder is configured to allocate sufficient memory to store the encoding parameters and image data for processing the second video data, and to switch to using that memory without reinitialization. In particular, the video decoder can be configured to have a first context for storing the encoding factors for the first format, and a second context for storing the encoding factors for the second format. Also, the video decoder is configured so that references to image data are provided in the form of indices instead of addresses. An encoded bitstream generally uses frame numbers or some syntax as defined in the video standard to reference images. After extracting one or more frame numbers from the encoded bitstream, a video decoder maps frame numbers to an index. In turn, using information about the encoding factors such as the format, the video decoder can map the index to an address based on the context.

Figure 3:
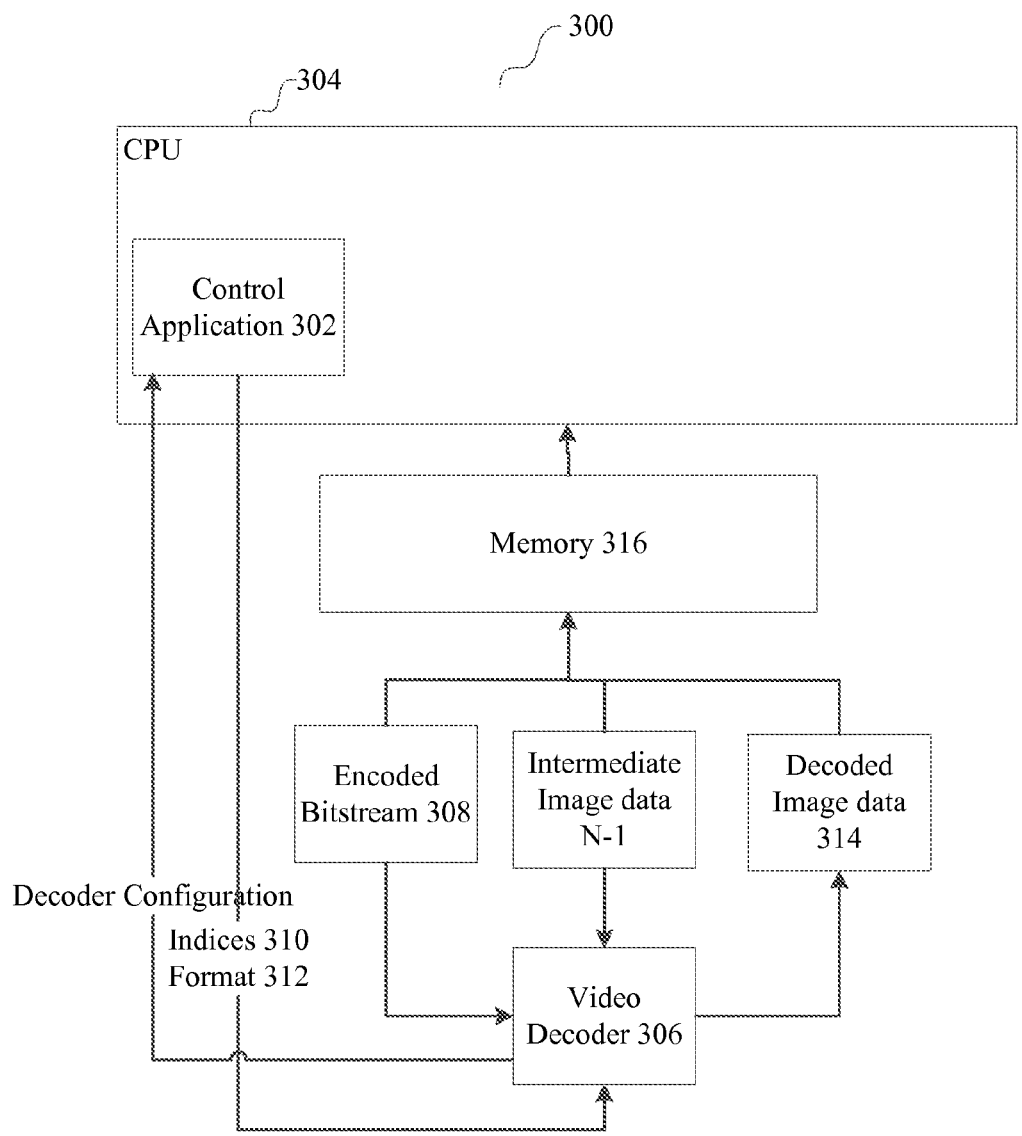
FIG. 3 is a block diagram of a video decoder.

Thus, as shown in FIG. 3, a video processing system 300 can be implemented using a control application 302 executing on a central processing unit 304 of a computing device and a video decoder 306. The video decoder 306 also can be implemented using the CPU or can be implemented using a GPU or other logic device.

The video decoder 306 is configure to receive, for an encoded bitstream 308, one or more image indices 310, and image format information 312, for each image to be decoded. The control application 302 that uses the video decoder can provide the image data 308 to be decoded at an address in memory 316, and can provide the image indices 310 and image format information 312 to the video decoder 306. Any intermediate image data generated by the video decoder also is stored by the video decoder 306 in memory 316. For the sake of simplicity in FIG. 3, it is assumed that decoding factors are part of the image data 308 to be decoded. The addresses in the memory 316 used by the video decoder 306 are computed based on the indices 310 associated with the image data and the format 312 of the image data. In particular, given a base address for the memory, and a base frame index, a product of an offset of a given index from the base frame index and an image size based on the format can be added to the base address to retrieve a memory location for storing image data for the given index. The different contexts for different formats provide a mechanism for disambiguating indices and mapping them to textures in the texture arrays or arrays of textures described below.

For example, in some implementations, decoded video data, and any intermediate image data for decoding, are stored as textures in texture array. For each format, textures are stored in contiguous locations in the memory 316, such as an array of N (N being a positive integer greater than one (1)) entries. Accordingly, in this implementation, when the video decoder is processing video data in a first format, texture array with N entries of a first size can be allocated in memory and used in a first context. When the format changes, the video decoder can allocate a second texture array of a second size in memory to accommodate N entries of textures in the second format in the second context. Because there is a period of time in which the video decoder operates in both contexts, the video decoder consumes available memory for the N-sized texture arrays in both contexts.

Based on the image data format and index information, the video decoder determines which texture array to use during a period of time when the video decoder is processing data in both formats. Thus, in this implementation, the video decoder is configured to allocate, for video data in a first format, first set of memory locations configured to store the data produced by the video decoder when decoding the encoded bitstream of video data in the first format, and wherein the video decoder is configured, in response to a change in the format from the first format to a second format, allocate a second set of memory locations configured to store the data produced by the video decoder when decoding the encoded bitstream of video data in a second format.

In another implementation, using the second technique mentioned above, the video decoder manages this memory 316, such that, in response to a format change, less memory can be consumed. In such an instance, decoded video data and the intermediate image data for decoding are stored as an "array of textures", without allocating two N entry texture arrays. To efficiently use the memory, memory is separately allocated and de-allocated for each texture. In this implementation, when the video decoder is processing video data in a first format, an index is mapped to a corresponding entry in the array of textures location in this texture array. When the format changes, the video decoder can map indices for textures in the second format to addresses within this array of textures, to accommodate image data in the second format. An example of such allocation is shown in FIGS. 4A and 4B.

Figure 4A:
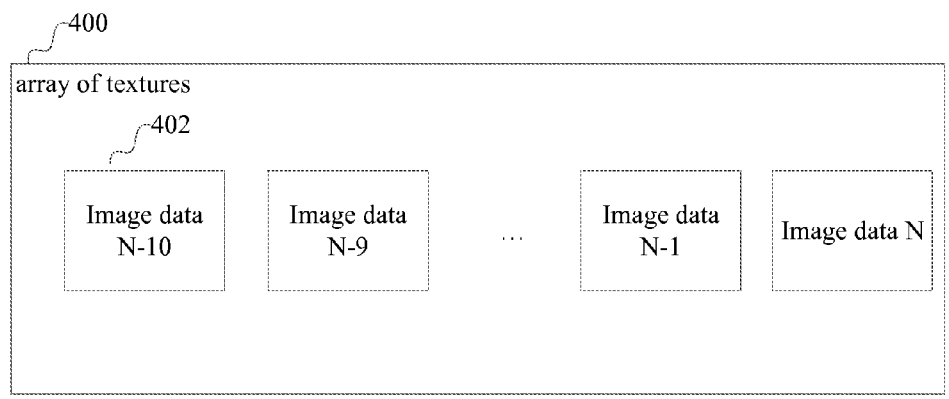
FIGS. 4A and 4B illustrate an example memory allocation.
Figure 4B:
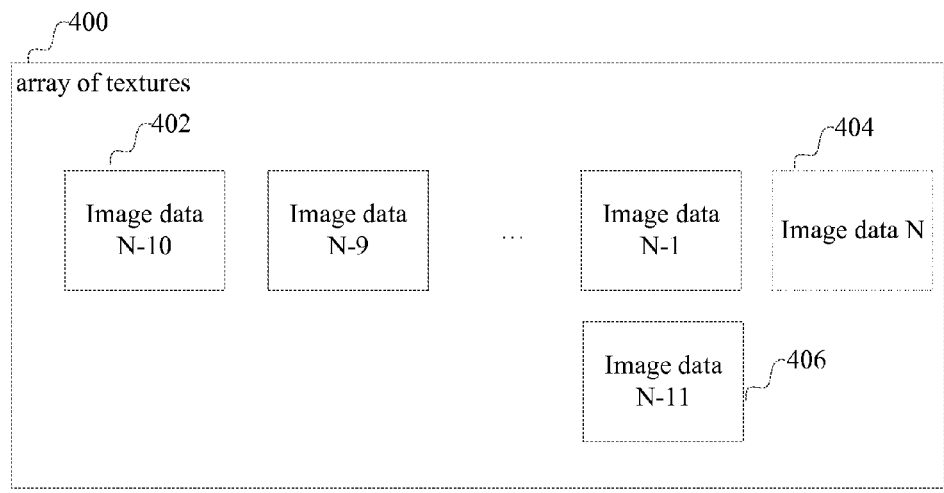

In FIG. 4A, an array of textures 400 includes a set of N separately allocated and de-allocated memory ranges 402, each capable of storing a texture of a first size. The an array of textures can be defined in a form of a ring buffer, for example, so that as memory is released after processing one image, its entry is replaced in the array with an entry for allocating memory for the next image. Such an array of textures is generated for each context in which the video decoder operates. While the video decoder is processing video data in a first format, the set of N memory ranges is being used to store textures of the first size. After information is received that the format of the video to be decoded will change, e.g., after processing image N-10, the video decoder continues to process the remaining video data in the first format, shown in FIG. 4A at N-1 through N-10. However, as the video decoder completes processing an image Ni, the memory locations for that image Ni are released (as indicated by the dashed line 404 in FIG. 4B) in the array of textures for the context used for processing the first format. Memory is allocated for the next texture (image N-11 406 in FIG. 4B) in the new format in the array of textures for the context used for processing the second format. This process continues until memory for textures in the first format are all released, and the video decoder then has only image data in the second format. Memory for texture data for the first format that is no longer being used can be deallocated; memory for texture data for the second format that will be used can be allocated and used by the video decoder. The specification of this array of textures can be performed by the computer program executed on the CPU that is managing the execution of shaders on a GPU or a hardware decoder to perform decoding of a sequence of encoded images.

A flowchart describing operation of such a video decoding system will now be described in connection with FIG. 5.

Figure 5:
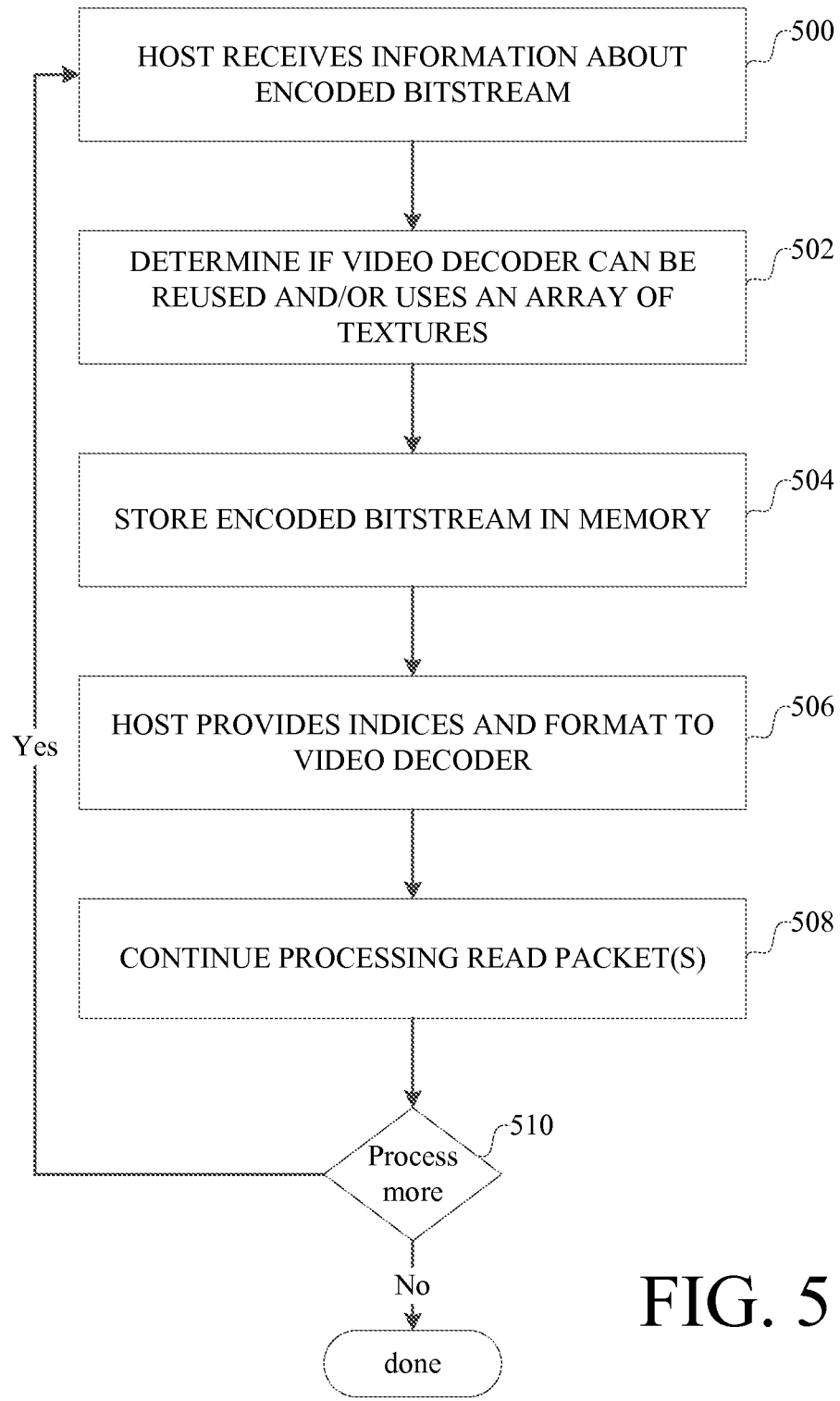
FIG. 5 is a flow chart of operation of a video decoder in an example implementation.

The process described in FIG. 5 is based on an implementation where a host computer program executing on a processing unit (CPU) controls decoding operations performed by the video decoder. The host computer program receives 500 information describing an encoded bitstream to be decoded and a resource to which the decoded image data derived from the encoded bitstream is to be output, typically specified by a memory location. The host computer program determines 502 if the video decoder has the capability of being reused and/or is capable of processing an array of textures. The remainder of the process described in FIG. 5 is based on an implementation in which the video decoder has both capabilities.

The host computer program stores 504 encoded video data in memory accessible by the video decoder. The host computer program provides 506 information to the video decoder indicating, for each context, indices for the frames to be decoded, the format(s) for the data, and an updated array of textures indicating how the memory is allocated. The video decoder then processes 508 video data and updates the video data in the array of textures as instructed. This process repeats, as indicated at 510, until the host computer program is instructed to stop decoding video data.

The foregoing examples are intended to illustrate, not limit, techniques used to manage frequent changes in multi-bit rate encoded bitstreams. By avoiding re-initialization of a decoder, decoding performance, with reduced latency, can be improved in the context of frequent format and encoding parameter changes. By having a video decoder that manages memory using an array of textures, memory utilization can be improved. In particular, transitioning between arrays of textures in different contexts reduces memory utilization. Such an implementation is particularly useful in mobile devices with limited processing and memory resources and battery power. By having a video decoder that can change format without re-initializing, and that can manage memory allocation efficiently during format changes, latency in playback due to the format switch and memory consumption can be improved. Power consumption also can be reduced.

Figure 6:
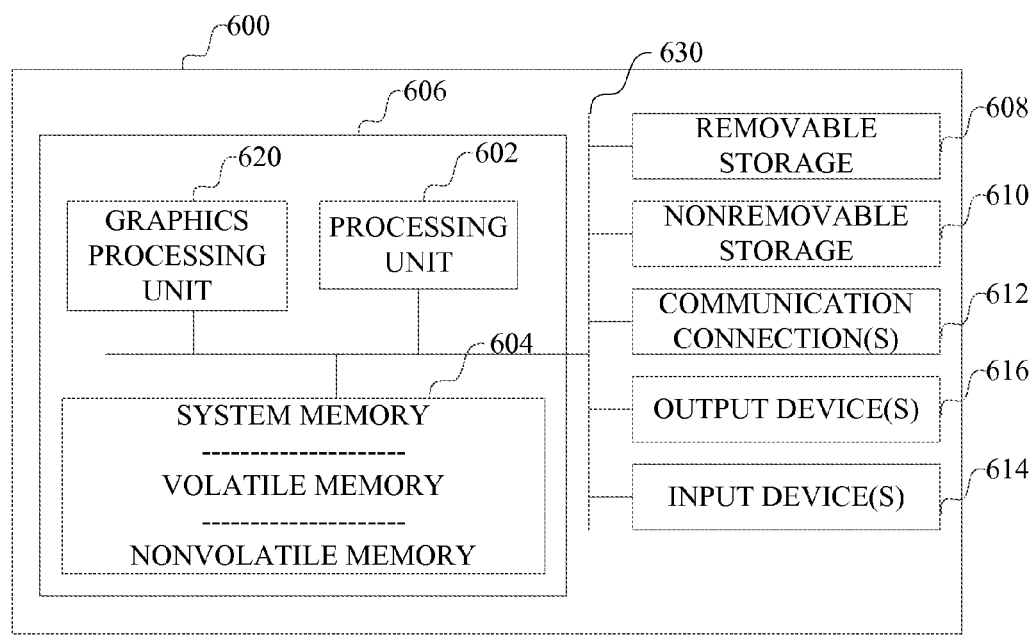
FIG. 6 is a block diagram of an example computing device with which components of a video processing system can be implemented.

Having now described an example implementation, FIG. 6 illustrates an example of a computing device in which such techniques can be implemented, whether implementing an encoder, decoder or preprocessor. This is only one example of a computer and is not intended to suggest any limitation as to the scope of use or functionality of such a computer.

The computer can be any of a variety of general purpose or special purpose computing hardware configurations. Some examples of types of computers that can be used include, but are not limited to, personal computers, game consoles, set top boxes, hand-held or laptop devices (for example, media players, notebook computers, tablet computers, cellular phones, personal data assistants, voice recorders), televisions or other display devices with built in processing systems, server computers, multiprocessor systems, microprocessor-based systems, programmable consumer electronics, networked personal computers, minicomputers, mainframe computers, and distributed computing environments that include any of the above types of computers or devices, and the like.

With reference to FIG. 6, an example computer 600 includes at least one processing unit 602 and memory 604. The computer can have multiple processing units 602. A processing unit 602 can include one or more processing cores (not shown) that operate independently of each other. Additional co-processing units, such as graphics processing unit 620, also can be present in the computer. The memory 604 may be volatile (such as dynamic random access memory (DRAM) or other random access memory device), non-volatile (such as a read-only memory, flash memory, and the like) or some combination of the two. Memory also can include registers or other dedicated memory locations in the processing units 602 and 620. This configuration of memory is illustrated in FIG. 6 by line 606. The computer 600 may include additional storage (removable and/or non-removable) including, but not limited to, magnetically-recorded or optically-recorded disks or tape. Such additional storage is illustrated in FIG. 6 by removable storage 608 and non-removable storage 610. The various components in FIG. 6 are generally interconnected by an interconnection mechanism, such as one or more buses 630.

A computer storage medium is any medium in which data can be stored in and retrieved from addressable physical storage locations by the computer. Computer storage media includes volatile and nonvolatile memory, and removable and non-removable storage media. Memory 604 and 606, removable storage 608 and non-removable storage 610 are all examples of computer storage media. Some examples of computer storage media are RAM, ROM, EEPROM, flash memory or other memory technology, CD-ROM, digital versatile disks (DVD) or other optically or magneto-optically recorded storage device, magnetic cassettes, magnetic tape, magnetic disk storage or other magnetic storage devices. The computer storage media can include combinations of multiple storage devices, such as a storage array, which can be managed by an operating system or file system to appear to the computer as one or more volumes of storage. Computer storage media and communication media are mutually exclusive categories of media.

Computer 600 may also include communications connection(s) 612 that allow the computer to communicate with other devices over a communication medium. Communication media typically transmit computer program instructions, data structures, program modules or other data over a wired or wireless substance by propagating a modulated data signal such as a carrier wave or other transport mechanism over the substance. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media such as acoustic, radio frequency, infrared and other wireless media. Communications connections 612 are devices, such as a wired network interface, wireless network interface, radio frequency transceiver, e.g., Wi-Fi, cellular, long term evolution (LTE) or Bluetooth, etc., transceivers, navigation transceivers, e.g., global positioning system (GPS) or Global Navigation Satellite System (GLONASS), etc., transceivers, that interface with the communication media to transmit data over and receive data from communication media, and may perform various functions with respect to that data.

Computer 600 may have various input device(s) 614 such as a keyboard, mouse or similar pointing device, pen, stylus, camera, touch input device, sensor (e.g., accelerometer or gyroscope), and so on. Computer 600 also may have various output device(s) 616 such as a display, speakers, a printer, and so on. All of these devices are well known in the art and need not be discussed at length here. The input and output devices can be part of a housing that contains the various components of the computer in FIG. 6, or can be separable from that housing and connected to the computer through various connection interfaces, such as a serial bus, wireless communication connection and the like. Various input and output devices can implement a natural user interface (NUI), which is any interface technology that enables a user to interact with a device in a "natural" manner, free from artificial constraints imposed by input devices such as mice, keyboards, remote controls, and the like.

Examples of NUI methods include those relying on speech recognition, touch and stylus recognition, hover, gesture recognition both on screen and adjacent to the screen, air gestures, head and eye tracking, voice and speech, vision, touch, gestures, and machine intelligence, and may include the use of touch sensitive displays, voice and speech recognition, intention and goal understanding, motion gesture detection using depth cameras (such as stereoscopic camera systems, infrared camera systems, and other camera systems and combinations of these), motion gesture detection using accelerometers or gyroscopes, facial recognition, three dimensional displays, head, eye, and gaze tracking, immersive augmented reality and virtual reality systems, all of which provide a more natural interface, as well as technologies for sensing brain activity using electric field sensing electrodes (such as electroencephalogram techniques and related methods).

The various storage 610, communication connections 612, output devices 616 and input devices 614 can be integrated within a housing with the rest of the computer, or can be connected through input/output interface devices on the computer, in which case the reference numbers 610, 612, 614 and 616 can indicate either the interface for connection to a device or the device itself as the case may be.

A computer generally includes an operating system, which is a computer program running on the computer which manages access to the various resources of the computer by applications. There may be multiple applications. The various resources include the memory, storage, communication devices, input devices and output devices, such as display devices and input devices as shown in FIG. 6.

The operating system and applications can be implemented using one or more processing units of one or more computers with one or more computer programs processed by the one or more processing units. A computer program includes computer-executable instructions and/or computer-interpreted instructions, such as program modules, which instructions are processed by one or more processing units in the computer. Generally, such instructions define routines, programs, objects, components, data structures, and so on, that, when processed by a processing unit, configure the processing unit, co-processing unit, or computing device, to perform operations on data or configure the processing unit, co-processing unit or computing device to implement various components or data structures.

Accordingly, in one aspect, a video processing system comprises a video decoder and memory. The video decoder comprises an input configured to receive, for an encoded bitstream of video data, indices of frames of the encoded video data and information describing a format of the encoded video data; and an output configured to provide decoded video data. The memory is accessible by the video decoder and configured to store an encoded bitstream of video data. The encoded bitstream comprises encoded video data according to a plurality of encoding factors. The memory is further configured to store data from the output of the video decoder at least based on the video decoder encoding the encoded bitstream. The video decoder is configured to receive, through the input, an indication of one or more indices for one or more frames of the video data from the encoded bitstream in the memory and one or more encoding factors of the video data. The video decoder is further configured to compute addresses in the memory at least using the one or more indices of the one or more frames and the one or more encoding factors of the video data. The video decoder is further configured to access the encoded bitstream from the memory at least using the computed addresses. The video decoder is further configured to decode the accessed encoded bitstream and output, through the output, to store in the memory, decoded video data at least based on the video decoder decoding of the encoded bitstream.

In another aspect, a video processing system includes a means for decoding an encoded bitstream of video data based at least on indices of frames of the encoded video data and information describing a format of the encoded video data. The encoded bitstream comprises video data encoded according to a plurality of encoding factors. The video processing system includes a means for computing addresses in a memory at least using the one or more indices of the one or more frames and the one or more encoding factors of the video data.

In another aspect, a process for decoding encoded video data comprises receiving, into memory, an encoded bitstream of video data comprising video data encoded using a plurality of encoding factors, a plurality of indices of frames of the encoded video data, and information describing one or more encoding factors of the encoded video data. The memory is configured to store video data produced by a video decoder at least based on decoding of the encoded bitstream. The video decoder is provided with an indication of one or more of the indices for one or more of the frames of the video data to be decoded and the one or more encoding factors of the video data. The video decoder computes addresses in the memory at least using the one or more indices of the one or more frames and the one or more encoding factors of the video data. The video decoder accesses the encoded bitstream from the memory at least using the computed addresses. The accessed encoded bitstream is decoded and stored decoded in the memory at least using the computed addresses.

In another aspect, a video processing system has a means for maintaining different contexts for decoding video data encoded with different encoding factors and a means for decoding the video data using the different contexts. A context can include indices for computing memory addresses to use for storing data based on decoding video data in that context. A context also can have associated memory for storing data based on decoding video data in that context.

In another aspect, a video processing system comprising a video decoder and a memory. The video decoder comprises an input configured to receive, for an encoded bitstream of video data, indices of frames of the encoded video data and information describing a format of the encoded video data. An output is configured to provide decoded video data, the encoded video data comprising encoded video data in a plurality of formats. The memory is accessible by the video decoder and configured to store the encoded bitstream and data from the output of the video decoder at least based on the video decoder decoding the encoded bitstream. The video decoder is further configured to compute addresses in the memory at least using the one or more indices of the one or more frames and the format of the video data, access and decode the encoded bitstream, and output decoded video data at least based on the computed addresses. The memory is configured to store an array of textures, the array of textures including, for video data in the plurality of formats, a first set of memory locations configured to store the data produced by the video decoder based on decoding of the encoded bitstream of video data in a first format, and a second set of memory locations configured to store the data produced by the video decoder based on decoding of the encoded bitstream of video data in a second format, a number of memory locations in the first set and a number of memory locations in the second set allocated so as to change while the video decoder is decoding the encoded bitstream.

In another aspect a video decoder includes a means for maintaining in memory an array of textures, the array of textures including, for video data in the plurality of formats, a first set of memory locations configured to store the data produced by the video decoder based on decoding of the encoded bitstream of video data in a first format, and a second set of memory locations configured to store the data produced by the video decoder based on decoding of the encoded bitstream of video data in a second format, a number of memory locations in the first set and a number of memory locations in the second set allocated so as to change while the video decoder is decoding the encoded bitstream.

In one aspect, a process for decoding encoded video data comprises receiving, into a memory, an encoded bitstream of video data comprising encoded video data in a plurality of formats, indices of frames of the encoded video data, and information describing a format of the encoded video data. The memory is configured to store video data, produced by a video decoder based on decoding of the encoded bitstream, in an array of textures, the array of textures including, for video data in the plurality of formats, a first set of memory locations configured to store the data produced by the video decoder based on decoding of the encoded bitstream of video data in a first format, and a second set of memory locations configured to store the data produced by the video decoder based on decoding of the encoded bitstream of video data in a second format, a number of memory locations in the first set and a number of memory locations in the second set being allocated so as to change while the video decoder is decoding the encoded bitstream. The video decoder is provided with an indication of one or more of the indices for one or more of the frames of the video data to be decoded and the format of the video data. The video decoder computes addresses in the memory at least using the one or more indices of the one or more frames and the format of the video data. The video decoder accesses and decodes the encoded bitstream from the memory at least using the computed addresses, to output decoded video data at least based on the computed addresses.

In any of the foregoing aspects, a computing device including the video processing system can further include a media playback application. The media playback application can configure the computing device to request a video program from a server computer over a computer network so as to cause the server computer to provide, to the computing device, the requested video program as the encoded bitstream of video data.

In any of the foregoing aspects, the encoded bitstream of video data can include a video program from a server computer over a computer network.

In any of the foregoing aspects, a requested video program, provided as the encoded bitstream of video data, can include streamed video data in a plurality of encoding factors. One or more encoding factors for the video data can change while the video data is being streamed, for example, from a server computer to the computing device.

In any of the foregoing aspects, the video processing system can include a control application executing on a processing unit of a computing device. The video decoder can be accessible to and further configured to be controlled by the processing unit. The video decoder can be further comprising an interface configured to output, to the control application, information indicating whether the video decoder can be reutilized in response to a change of one or more encoding factors of the video data in the encoded bitstream. The control application can configure the processing unit to output the indication of one or more indices for one or more frames of the video data and the encoding factors of the video data to the video decoder according to the information.

In any of the foregoing aspects, the video decoder can include a shader configured to be executable on a graphics processing unit of the computing device, or dedicated hardware in a graphics processing unit of the computing device.

In any of the foregoing aspects, the video decoder can be further configured to: allocate, for video data in a first format, a first set of memory locations configured to store video data produced by the video decoder based on decoding of the encoded bitstream of video data in the first format, and in response to a change in the format from the first format to a second format, allocate a second set of memory locations configured to store the video data produced by the video decoder based on decoding of the encoded bitstream of video data in a second format.

In any of the foregoing aspects, the video decoder can provide information to a processing unit indicating whether the video decoder uses the array of textures.

In any of the foregoing aspects, the video decoder can provide information indicating whether the video decoder supports switching between contexts.

In any of the foregoing aspects, a processing unit can be configured to provide one or more indices for one or more frames of the video data and the format of the video data to the video decoder based on the providing of information indicating whether the video decoder uses the array of textures and/or whether the video decoder supports switching between contexts.

In any of the foregoing aspects, the array of textures includes a ring buffer of textures, wherein a size of each texture depends on a format of video data processed by the video decoder.

Any of the foregoing aspects related either to a video decoder using indices to access video data in memory, or to a video decoder capable of switching contexts for decoding for different encoding factors, can be combined with any of the other foregoing aspects related to a video decoder using an array of textures for managing memory.

Any of the foregoing aspects may be embodied in one or more computers, as any individual component of such a computer, as a process performed by one or more computers or any individual component of such a computer, or as an article of manufacture including computer storage with computer program instructions are stored and which, when processed by one or more computers, configure the one or more computers.

Any or all of the aforementioned alternate embodiments described herein may be used in any combination desired to form additional hybrid embodiments. It should be understood that the subject matter defined in the appended claims is not necessarily limited to the specific implementations described above. The specific implementations described above are disclosed as examples only.

What is claimed is:

1. A computing device comprising a video processing system, the video processing system comprising:
   a video decoder comprising:
      an input configured to receive, for an encoded bitstream of video data, indices of frames of the encoded video data and information describing a format of the encoded video data; and
      an output configured to provide decoded video data, the encoded video data comprising encoded video data in a plurality of formats; and
   memory accessible by the video decoder and configured to store the encoded bitstream and data from the output of the video decoder at least based on the video decoder decoding the encoded bitstream;
   the video decoder configured to:
      compute addresses in the memory at least using the one or more indices of the one or more frames and the format of the video data;
      access and decode the encoded bitstream; and
      output decoded video data at least based on the computed addresses;
   wherein the memory is configured to store an array of textures, the array of textures including, for video data in the plurality of formats, a first set of a first number of memory locations configured to store the data produced by the video decoder based on decoding of the encoded bitstream of video data in a first format, and a second set of second number of memory locations configured to store the data produced by the video decoder based on decoding of the encoded bitstream of video data in a second format, wherein, after a change from the first format to the second format, the video decoder deallocates memory locations in the first set after completing processing of an image of video data in the first format and allocates memory locations in the second set for images to be processed in the second format, while the video decoder is decoding the encoded bitstream.

2. The computing device of claim 1, further comprising:
   a media playback application that, when executed on the computing device, configures the computing device to request a video program from a server computer over a computer network so as to cause the server computer to provide, to the computing device, the requested video program as the encoded bitstream of video data.

3. The computing device of claim 2, wherein the requested video program provided as the encoded bitstream of video data includes streamed video data in the plurality of formats such that a format of the video data changes while the video data is being streamed from the server computer to the computing device.

4. The computing device of claim 1, wherein the video processing system further comprises:
   a control application executing on a processing unit of the computing device; and the video decoder being accessible to and controlled by the processing unit and comprising an interface configured to output to the control application information indicating whether the video decoder uses the array of textures;

the control application configuring the processing unit to output the indication of one or more indices for one or more frames of the video data and the format of the video data to the video decoder according to the information.

5. The computing device of claim 1, wherein the video decoder comprises a shader configured to be executable on a graphics processing unit of the computing device.

6. The computing device of claim 1, wherein the video decoder comprises dedicated decoding logic in a graphics processing unit of the computing device.

7. The computing device of claim 1 wherein the array of textures is defined in a form of a ring buffer of textures, including one or more textures of a first size for images from video data in the first format and one or more textures of a second size for images from video data in the second format.

8. A computer-implemented process performed by a computing device comprising a video decoder, the process comprising:

receiving, into a memory of the computing device, an encoded bitstream of video data comprising encoded video data in a plurality of formats, indices of frames of the encoded video data, and information describing a format of the encoded video data;

configuring the memory to store video data, produced by the video decoder based on decoding of the encoded bitstream, in an array of textures, the array of textures including, for video data in the plurality of formats, a first set of a first number of memory locations configured to store the data produced by the video decoder based on decoding of the encoded bitstream of video data in a first format, and a second set of a second number of memory locations configured to store the data produced by the video decoder based on decoding of the encoded bitstream of video data in a second format, wherein, after a change from the first format to the second format, the video decoder deallocates memory locations in the first set after completing processing of an image of video data in the first format and allocates memory locations in the second set being allocated so as to change for images to be processed in the second format, while the video decoder is decoding the encoded bitstream;

providing the video decoder with an indication of one or more of the indices for one or more of the frames of the video data to be decoded and the format of the video data;

computing, by the video decoder, addresses in the memory at least using the one or more indices of the one or more frames and the format of the video data; and accessing and decoding, by the video decoder, the encoded bitstream from the memory at least using the computed addresses, to output decoded video data at least based on the computed addresses.

9. The computer-implemented process of claim 8, further comprising:

requesting a video program from a server computer over a computer network so as to cause the server computer to provide the requested video program as the encoded bitstream of video data.

10. The computer-implemented process of claim 9, wherein the requested video program provided as the encoded bitstream of video data includes streamed video data in the plurality of formats such that a format of the video data changes while the video data is being streamed from the server computer to the computing device.

11. The computer-implemented process of claim 8, further comprising:

accessing, by a processing unit, information indicating whether the video decoder uses the array of textures; and outputting, by the processing unit, the indication of one or more indices for one or more frames of the video data and the format of the video data to the video decoder according to the information.

12. The computer-implemented process of claim 8, wherein the video decoder comprises dedicated decoding logic of a graphics processing unit of the computing device.

13. The computer-implemented process of claim 8, wherein the video decoder comprises a shader configured to be executable on a graphics processing unit of the computing device.

14. The computer-implemented process of claim 8, wherein the array of textures is defined in a form of a ring buffer of textures, including one or more textures of a first size for images from video data in the first format and one or more textures of a second size for images from video data in the second format.

15. A computer readable storage medium, comprising a storage device or a memory device, and computer program instructions for a computing device, encoded on the computer readable storage medium, the computing device comprising a video decoder comprising an input configured to receive, for an encoded bitstream of video data, indices of frames of the encoded video data, and information describing a format of the encoded video data, and an output configured to provide decoded video data, the encoded video data comprising encoded video data in a plurality of formats, the computing device further comprising a memory accessible by the video decoder and configured to store the encoded bitstream and data from the output of the video decoder at least based on the video decoder decoding of the encoded bitstream, the computer program instructions, when executed by the computing device, configuring the computing device to:

receive, into the memory, an encoded bitstream of video data comprising encoded video data in a plurality of formats, indices of frames of the encoded video data, and information describing a format of the encoded video data;

configure the memory to store video data, produced by a video decoder based on decoding of the encoded bitstream, in an array of textures, the array of textures including, for video data in the plurality of formats, a first set of a first number of memory locations configured to store the data produced by the video decoder based on decoding of the encoded bitstream of video data in a first format, and a second set of a second number of memory locations configured to store the data produced by the video decoder based on decoding of the encoded bitstream of video data in a second format, wherein, after a change from the first format to the second format, the video decoder deallocates memory locations in the first set after completing processing of an image of video data in the first format, and allocates memory locations in the second set for images to be processed in the second format, while the video decoder is decoding the encoded bitstream;

provide the video decoder with an indication of one or more of the indices for one or more of the frames of the video data to be decoded and the format of the video data;

compute, using the video decoder, addresses in the memory at least using the one or more indices of the one or more frames and the format of the video data; and access and decode, using the video decoder, the encoded bitstream from the memory at least using the computed addresses, to output decoded video data at least based on the computed addresses.

16. The computer readable storage medium of claim 15, wherein the computing device is further configured to receive a video program from a server computer over a computer network as the encoded bitstream of video data.

17. The computer readable storage medium of claim 16, wherein the received video program includes streamed video data in the plurality of formats such that a format of the video data changes while the video data is being streamed from the server computer to the computing device.

18. The computer readable storage medium of claim 15, wherein the computing device is further configured to:
    access, using a processing unit of the computing device, information indicating whether the video decoder uses the array of textures; and
    outputting, by the processing unit, the indication of one or more indices for one or more frames of the video data and the format of the video data to the video decoder at least based on the information.

19. The computer readable storage medium of claim 18, wherein the video decoder comprises dedicated decoding logic in a graphics processing unit of the computing device.

20. The computer readable storage medium of claim 15, wherein the array of textures is defined in a form of a ring buffer of textures, including one or more textures of a first size for images from video data in the first format and one or more textures of a second size for images from video data in the second format.

21. The computer readable storage medium of claim 15, wherein the video decoder comprises a shader configured to be executable on a graphics processing unit of the computing device.

22. The computing device of claim 1, wherein the video decoder is configured to have a first context for storing encoding factors for the first format, and a second context for storing encoding factors for the second format, and wherein the video decoder is configured to compute the addresses in the memory further based on the encoding factors according to the first context when decoding video data in the first format and according to the second context when decoding video data in the second format.

23. The computer readable storage medium of claim 15, wherein the video decoder is configured to have a first context for storing encoding factors for the first format, and a second context for storing encoding factors for the second format, and wherein the video decoder is configured to compute the addresses in the memory further based on the encoding factors according to the first context when decoding video data in the first format and according to the second context when decoding video data in the second format.

24. The computer implemented process of claim 8, wherein the video decoder is configured to have a first context for storing encoding factors for the first format, and a second context for storing encoding factors for the second format, and wherein the video decoder is configured to compute the addresses in the memory further based on the encoding factors according to the first context when decoding video data in the first format and according to the second context when decoding video data in the second format.

* * * * *